US009383063B2

(12) United States Patent
Gupta et al.

(10) Patent No.: US 9,383,063 B2
(45) Date of Patent: *Jul. 5, 2016

(54) HYDROGEN DISPENSING SYSTEM AND METHOD THEREOF

(71) Applicant: SHELL OIL COMPANY, Houston, TX (US)

(72) Inventors: Nikunj Gupta, Bangalore (IN); Brad John Smith, Kingwood, TX (US)

(73) Assignee: Shell Oil Company, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/548,839

(22) Filed: Nov. 20, 2014

(65) Prior Publication Data
US 2015/0316211 A1    Nov. 5, 2015

Related U.S. Application Data

(63) Continuation of application No. 12/840,159, filed on Jul. 20, 2010.

(60) Provisional application No. 61/227,453, filed on Jul. 22, 2009.

(51) Int. Cl.
*F17C 7/04* (2006.01)
*F17C 5/06* (2006.01)

(52) U.S. Cl.
CPC ... *F17C 7/04* (2013.01); *F17C 5/06* (2013.01); *F17C 2203/03* (2013.01); *F17C 2205/013* (2013.01); *F17C 2205/0138* (2013.01); *F17C 2205/0323* (2013.01); *F17C 2205/0376* (2013.01); *F17C 2221/012* (2013.01); *F17C 2223/0161* (2013.01); *F17C 2223/033* (2013.01); *F17C 2225/0123* (2013.01); *F17C 2225/036* (2013.01); *F17C 2227/0107* (2013.01); *F17C 2227/0121* (2013.01); *F17C 2227/0135* (2013.01); *F17C 2227/0302* (2013.01); *F17C 2227/0304* (2013.01); *F17C 2227/0306* (2013.01); *F17C 2227/0309* (2013.01); *F17C 2227/0393* (2013.01); *F17C 2227/043* (2013.01); *F17C 2250/01* (2013.01); *F17C 2260/025* (2013.01); *F17C 2265/03* (2013.01); *F17C 2265/05* (2013.01); *F17C 2265/065* (2013.01); *F17C 2270/016* (2013.01); *F17C 2270/0147* (2013.01); *F17C 2270/0168* (2013.01); *F17C 2270/0171* (2013.01); *F17C 2270/0173* (2013.01); *F17C 2270/0178* (2013.01); *F17C 2270/0184* (2013.01); *Y02E 60/321* (2013.01)

(58) Field of Classification Search
CPC ............... F17C 9/02; F17C 2221/012; F17C 2225/036; F17C 2265/065; F17C 7/04; F17C 2227/0393
USPC ............. 141/4, 11, 37, 82, 95, 104, 197–198; 222/3; 62/50.1, 50.2
See application file for complete search history.

(56) References Cited

U.S. PATENT DOCUMENTS

| 4,175,395 | A  | 11/1979 | Prost et al.    |
| 5,231,838 | A  | 8/1993  | Cieslukowski    |
| 5,924,291 | A  | 7/1999  | Weiler et al.   |
| 6,044,947 | A  | 4/2000  | Kinoshita       |
| 6,786,053 | B2 | 9/2004  | Drube           |
| 7,131,278 | B2 | 11/2006 | Svensson et al. |
| 8,210,214 | B2 | 7/2012  | Casey et al.    |
| 8,291,944 | B2 | 10/2012 | Allidieres      |

FOREIGN PATENT DOCUMENTS

| DE | 10021681   | 11/2001 |
| GB | 2391607    | 11/2004 |
| JP | 2009510352 | 3/2009  |
| JP | 2009127813 | 6/2009  |
| JP | 2010510463 | 4/2010  |
| JP | 2010196700 | 9/2010  |
| WO | 2007036651 | 4/2007  |

*Primary Examiner* — Mark A Laurenzi
*Assistant Examiner* — Timothy P Kelly

(57) ABSTRACT

The invention provides a hydrogen dispensing system comprising: a feed vessel for storing liquid hydrogen having an inlet and an outlet; a flash drum having an inlet and an outlet; a dispenser for dispensing gaseous hydrogen at a pressure of greater than 300 bar, having an inlet and an outlet wherein the feed vessel outlet is in fluid communication with the flash drum inlet, the flash drum outlet is in fluid communication with the dispenser inlet and there is no compression apparatus between the feed vessel outlet and the dispenser outlet. The invention also provides a method of providing gaseous hydrogen to a vehicle.

19 Claims, 1 Drawing Sheet

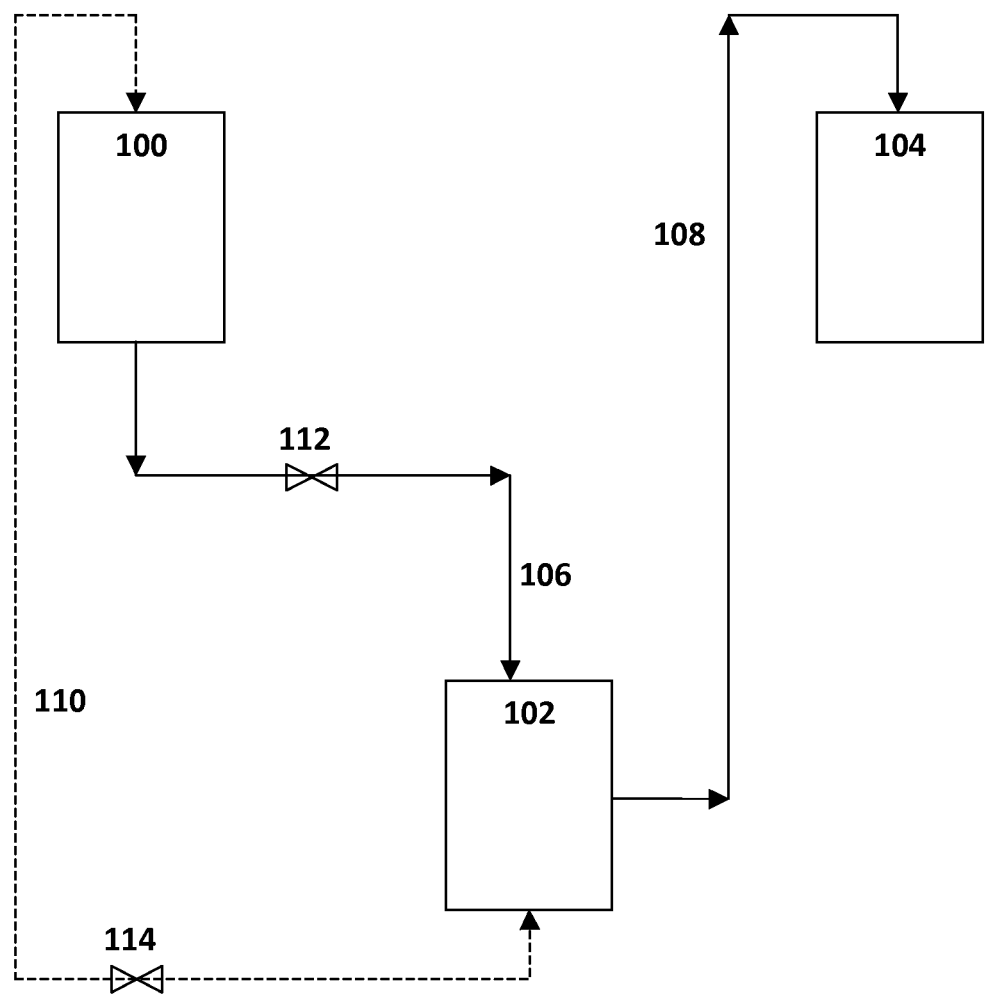

HYDROGEN DISPENSING SYSTEM AND METHOD THEREOF

This is a continuation application from U.S. patent application Ser. No. 12/840,159, filed Jul. 20, 2010 which claims the benefit of U.S. Provisional Application No. 61/227,453 filed Jul. 22, 2009.

FIELD

This invention relates to a system for dispensing hydrogen and a method thereof.

BACKGROUND

In recent years, there has been a great deal of interest in the development of alternative energy sources, or energy carriers, such as hydrogen. Automobiles and other vehicles that use hydrogen as a fuel source have been developed, but methods for refueling these vehicles that can compete with gasoline fueling stations on scale or cost have not yet been developed. Gasoline fueling stations are very simple and typically only consist of tanks for storing the gasoline and one or more pumps. The options that have been developed for hydrogen fueling to date are expensive, too large and require excessive maintenance.

One option that has been developed provides for storage of gaseous hydrogen at the fueling station and one or more large compressors that are used to raise the pressure of the hydrogen to the pressure required for fueling, typically from 300 to 700 bar.

This option has a large footprint due to the size and design of the compressor system as well as high energy usage.

Another option that has been developed provides for storage of liquid hydrogen at the fueling station. The liquid hydrogen is pumped by a cryopump to a higher pressure and then it is evaporated to gaseous hydrogen that is used for fueling. Both of these options and the others known to those of ordinary skill in the art require mechanical compression or pumping to raise the pressure of the hydrogen for use in fueling vehicles.

To provide a suitable hydrogen dispensing system, the system must be much simpler, cheaper and require less space. In addition, the maintenance requirements and energy use must be reduced to make hydrogen fueling stations a viable alternative to gasoline stations.

SUMMARY

The invention provides a hydrogen dispensing system comprising: a feed vessel for storing liquid hydrogen at a temperature of less than 30 K having an inlet and an outlet; a flash drum having an inlet and an outlet; a dispenser for dispensing gaseous hydrogen at a pressure of greater than 300 bar, having an inlet and an outlet wherein the feed vessel outlet is in fluid communication with the flash drum inlet, the flash drum outlet is in fluid communication with the dispenser inlet and there is no compression apparatus between the feed vessel outlet and the dispenser outlet.

The invention also provides a method of providing gaseous hydrogen to a vehicle comprising: storing a liquid hydrogen source in a feed vessel at a temperature of less than 30 K; passing a portion of the liquid hydrogen in the feed vessel to a flash drum; providing sufficient heat to the flash drum to convert the liquid hydrogen to gaseous hydrogen; passing the gaseous hydrogen to a dispenser; passing gaseous hydrogen from the dispenser to the vehicle at a pressure of greater than 300 bar wherein no compression apparatus is used.

BRIEF DESCRIPTION OF THE DRAWINGS

FIG. 1 depicts an embodiment of a hydrogen dispensing system.

DETAILED DESCRIPTION

The invention described herein provides a hydrogen dispensing system that provides high pressure gaseous hydrogen without the use of a compression apparatus. A compression apparatus is herein defined as any mechanical apparatus that has moving parts and is used to raise the pressure of a vapor or a liquid such as compressors and pumps, including cryopumps.

The liquid hydrogen may be prepared by any method and can be transported to the station by any method known to one of ordinary skill in the art.

Liquid hydrogen inherently comprises very low amounts of contaminants or impurities. As a consequence, the produced gaseous hydrogen produced by evaporating the liquid hydrogen is also relatively pure.

One embodiment of the system will be described in relation to FIG. 1. FIG. 1 depicts a hydrogen dispensing system. The system has a feed vessel 100 that is suitable for storing liquid hydrogen. The vessel may be insulated and/or cooled to maintain a temperature low enough that liquid hydrogen will remain in its liquid state. In one embodiment, the vessel is designed to withstand high pressures as are seen throughout the dispensing system. In another embodiment the vessel is designed to function at or near atmospheric pressure.

In another embodiment, feed vessel 100 is located underground. This has the advantage of lowering the overall footprint.

In a further embodiment, the feed vessel may be provided in the form of a transportable vessel, in particular a vessel mounted on a trailer, truck, train or other (self-) propelled vehicle. By omitting the need to fill an immobilized storage vessel at the site, the boil-off losses generated during the transfer to the liquid hydrogen into the storage vessel are omitted. Also the delivery time at the station can be significantly reduced. The feed vessel has an inlet for filling with liquid hydrogen (not shown) and an outlet that is in fluid communication with feed line 106. The feed line is used to pass liquid hydrogen from the feed vessel 100 to the flash drum 102. The feed line typically has a valve 112 or other device to control the flow of liquid hydrogen to the flash drum.

The system has one or more flash drums 102 that are suitable for holding liquid and/or gaseous hydrogen. The flash drum is designed such that the temperature of its contents is greater than the temperature of the feed vessel. The flash drum will function as a heat exchanger and it may in fact be a heat exchanger. The flash drum may be heated to provide the heat sufficient to vaporize the liquid hydrogen. The flash drum may be heated by ambient conditions, alone or in combination with another heating source. Ambient conditions are defined herein as the temperature of the environment surrounding the flash drum.

The flash drum may be located inside or outside, so the ambient conditions could be room temperature or the outdoor temperature at the location. Insulation may be used to prevent heat loss or to control the rate of heat exchange between the flash drum and its surroundings. In one embodiment, one or more flash drums are located underground. Again this has the benefit of lowering the overall footprint. In addition, locating the flash drum underground may improve the heating of the flash drum, due to the better heat conduction properties of the soil compared to air.

Since the ambient conditions may not be consistent, due to weather or seasonal changes, and also to accelerate the process if necessary, the flash drum may also be equipped with a heat source that can be used to provide additional heat as needed. Examples of heaters that would be suitable for this application include electrical heaters, steam heaters and heat exchangers that use a heated stream to exchange heat with the flash drum or the liquid hydrogen in the flash drum. In one embodiment the flash drum could be force heated by a thermoelectric heater, wherein the temperature difference between the $LH_2$ and ambient can be utilized to provide the electricity for heating. In a most simplistic form this could consist of a thermo-electric resistive mat on the outside or inside of the bank vessels.

The flash drum has an inlet that is in fluid communication with feed line 106 and an outlet that is in fluid communication with the dispensing line 108. The dispensing line is used to pass gaseous hydrogen from the flash drum 102 to the dispenser 104.

The system has a dispenser 104 that is suitable for dispensing high pressure gaseous hydrogen or a mixture of gaseous and liquid hydrogen to automobiles or other vehicles. The dispenser may be of any type that can provide hydrogen. The dispenser may be connected to a vehicle or to a hydrogen tank, cartridge or other storage vessel that is used to provide hydrogen to a vehicle. The dispensing line 108 may have a device to control the flow of gaseous hydrogen to the dispenser. Alternatively, the flow of hydrogen may be controlled by the dispenser itself.

In one embodiment, the system comprises a high-pressure line 110 that is used to provide pressure to the head of the feed vessel 100. In operation, this line could be used to provide pressure to help move the liquid hydrogen from the feed vessel 100 to the flash drum 102. The valve 114 may be opened to allow the pressure of the flash drum 102 to be communicated to the feed vessel 100. The valve 114 may be closed and reopened as needed to provide additional pressure to the feed vessel.

The feed vessel 100 may be located higher than the flash drum 102 to allow gravity to assist the flow of liquid hydrogen from the feed vessel 100 to the flash drum 102. Alternative methods can employ the use of transfer pumps or differential pressure between the vessels. One of ordinary skill in the art could employ whatever means necessary to ensure that there was sufficient force to move the liquid hydrogen from the feed vessel 100 to the flash drum 102.

In another embodiment, a compressor may be used to pressurize the feed vessel. A small compressor may be in fluid communication with the high pressure line 110 such that the pressure of the head of the feed vessel would be higher than the pressure of the flash drum. This would provide additional force to move the liquid hydrogen to the flash drum. The compressor would not be as large as one that would be needed to compress all of the gaseous hydrogen to a high pressure.

In another embodiment, the feed vessel provides liquid hydrogen to an intermediate and smaller cryogenic system supply vessel(s) designed to handle full system pressures. The interface between the feed vessel and the supply vessel would be managed by appropriate piping and controls to ensure the feed vessel is not exposed to system pressures. The supply vessel(s) would then pass hydrogen to the flash drum(s) and management of system pressures and residual gas from the flash drum(s) would be incorporated.

In one embodiment, intermediate storage is used to store the gaseous hydrogen produced in the flash drum 102 before it is dispensed to a vehicle via the dispenser 104. This intermediate storage may comprise any method for storing gaseous hydrogen.

The method of producing high pressure hydrogen is outlined below. As described above, liquid hydrogen is received into the feed vessel 100. The temperature of this vessel is maintained at a temperature to keep the hydrogen in liquid form. The temperature may be in a range of from 1 K to 30 K, preferably in a range of from 15 K to 25 K. Some portion of the liquid hydrogen may evaporate in the feed vessel, but it is desirable to minimize this evaporation.

The liquid hydrogen is fed via the feed line 106 to the flash drum 102. The valve 112 is opened for this step and then closed when the proper amount of liquid hydrogen has been fed to the flash drum.

The temperature of the flash drum is such that at least a portion of the liquid hydrogen vaporizes in this vessel. It is preferred that a substantial portion of the liquid hydrogen vaporizes in this vessel; preferably at least 50%, more preferably at least 75% and most preferably at least 90% of the liquid hydrogen. The flash drum is a closed vessel with a specified volume. The pressure of the gaseous hydrogen is dependent on the amount of liquid hydrogen fed to the flash drum.

Sufficient liquid hydrogen is fed to the flash drum such that when vaporized the gaseous hydrogen will be at a pressure of greater than 300 bar, preferably greater than 500 bar and more preferably greater than 700 bar. The pressure may be in a range of from 200 bar to 1000 bar, preferably in a range of from 300 bar to 800 bar. Depending on the application and the requirements of the vehicle being fueled the system can be adjusted to provide gaseous hydrogen at multiple pressures. It is understood that the hydrogen produced will be at a pressure sufficient to fuel the vehicles including overcoming pressure drop in the system.

In one embodiment, a cascade of flash drums is provided each flash drum in the cascade set to provide high pressure gaseous hydrogen at a specific pressure, i.e., at 450 bar for those vehicles that require the hydrogen to be fed at 350 bar and at 700 bar for those vehicles that require the hydrogen to be fed at 700 bar. Alternatively, a continuously operated cascade of flash drums is provided. For example, a first flash drum is filled with liquid hydrogen and the liquid hydrogen supply is halted. The flash drum is heated to provide gaseous pressure at a high pressure, e.g. 700 bar. As gaseous hydrogen is removed from the flash drum the pressure drops to pressures below 700 bar. At this time, a second flash drum, which is full, takes over the supply of high pressure gaseous hydrogen, in this case 700 bar, while the first flash drum is used to provide medium pressure gaseous hydrogen, e.g. 500 bar. This process is continued until the first (or second) flash drum cannot provide gaseous hydrogen at sufficient pressure anymore and the first flash drum is refilled with liquid hydrogen to provide high pressure hydrogen again or optionally a third flash drum is used to provide high pressure gaseous hydrogen while the second drum is directed at providing medium pressure gaseous hydrogen and the first flash drum is directed at providing low pressure, e.g. 350 bar, gaseous hydrogen. This procedure operated continuously. It will be appreciated that the number or incremental pressure steps is dependent of the dispensing requirements as is the number of flash drums provided in the cascade.

As the hydrogen dispensing procedure and in addition filling of the vehicle hydrogen tank produces significant amounts of heat, there is a need to provide the gaseous hydrogen at low temperatures. Typically, the gaseous hydrogen is dispensed a temperatures of in the range of from −40 to −20° C. Due to the low temperature of the liquid hydrogen, the system can be operated to dispense sufficiently cold gaseous hydrogen, without the need to pre-cool the gaseous hydrogen prior to dispensing.

In one embodiment, the system is operated to be able to dispense high pressure gaseous hydrogen at cryogenic temperatures, i.e. cryo-compressed hydrogen, in particular gaseous hydrogen at a pressure of in the range of from 300 to 500 bar, preferably 350 to 400 bar and a temperature of in the range of from 100 to 200 K. Cryo-compressed hydrogen has a higher density compared due to the low temperature allowing more hydrogen to be stored on board of a vehicle and allowing for shorter refueling times.

The gaseous hydrogen may be passed directly to the dispenser or it may be passed to intermediate storage for the gaseous hydrogen. The intermediate storage may be designed to store hydrogen at multiple pressures, i.e., at 300, preferably 450, bar for those vehicles that require the hydrogen to be fed at 300, respectively preferably 350, bar and at 700, preferably 850, bar for those vehicles that require the hydrogen to be fed at 700 bar. The intermediate storage may be continuously operated as described herein above for the cascade of flash drums.

The system may additionally comprise a dispenser for dispensing liquid hydrogen or a mixture of gaseous and liquid hydrogen directly from the feed vessel. In this way the system could be designed to meet different refueling requirements and could for example, refuel vehicles with liquid hydrogen and with gaseous hydrogen at pressures up to 700 bar.

The invention claimed is:

1. A method of providing gaseous hydrogen to a vehicle comprising:
   a. storing a liquid hydrogen source in a feed vessel at a temperature of less than 30 K;
   b. passing a portion of the liquid hydrogen in the feed vessel to a first flash drum;
   c. passing a portion of the liquid hydrogen in the feed vessel to a second flash drum;
   d. providing sufficient heat to the first flash drum to convert at least a portion of the liquid hydrogen to gaseous hydrogen;
   e. passing the gaseous hydrogen from the first flash drum to a dispenser;
   f. when the pressure of the gaseous hydrogen from the first flash drum drops to below a first pressure, providing sufficient heat to the second flash drum filled with liquid hydrogen to convert at least a portion of the liquid hydrogen to gaseous hydrogen to provide gaseous hydrogen at or above the first pressure;
   g. passing the gaseous hydrogen from the second flash drum to the dispenser; and
   h. passing the gaseous hydrogen from the dispenser to the vehicle at a pressure of greater than 300 bar wherein no compression apparatus is used.

2. A method as claimed in claim 1 wherein the gaseous hydrogen is passed from the dispenser at a pressure of greater than 700 bar.

3. A method as claimed in claim 1 wherein the heat to the first and second flash drums is provided by exposure of the first and second flash drums to ambient temperatures.

4. A method as claimed in claim 1 further comprising passing at least a portion of the gaseous hydrogen to a storage vessel before passing it to the dispenser.

5. A method as claimed in claim 1 wherein heat to the first and second flash drums is provided by a heat source that provides a greater heat flux than that provided by exposure to ambient conditions.

6. A method as claimed in claim 1 wherein the heat to the first and second flash drums is provided by the flash drums functioning as heat exchangers.

7. A method as claimed in claim 1 wherein a high pressure line is used to provide pressure to the head of the feed vessel to help move the liquid hydrogen from the feed vessel to the flash drums.

8. A method as claimed in claim 1 wherein the feed vessel is located higher than the flash drums to allow gravity to assist the flow of liquid hydrogen from the feed vessel to the flash drums.

9. A method of providing gaseous hydrogen to a vehicle comprising:
   a. storing a liquid hydrogen source in a feed vessel at a temperature of less than 30 K;
   b. passing a portion of the liquid hydrogen in the feed vessel to a first flash drum;
   c. passing a portion of the liquid hydrogen in the feed vessel to a second flash drum;
   d. providing sufficient heat to the first flash drum to convert at least a portion of the liquid hydrogen to gaseous hydrogen;
   e. passing the gaseous hydrogen from the first flash drum to a dispenser;
   f. providing sufficient heat to the second flash drum filled with liquid hydrogen to convert at least a portion of the liquid hydrogen to gaseous hydrogen;
   g. passing the gaseous hydrogen from the second flash drum to the dispenser; and
   h. passing the gaseous hydrogen from the dispenser to the vehicle at a pressure of greater than 300 bar wherein no compression apparatus is used.

10. A method as claimed in claim 9 wherein the gaseous hydrogen is passed from the dispenser at a pressure of greater than 700 bar.

11. A method as claimed in claim 9 wherein the heat to the first and second flash drums is provided by exposure of the first and second flash drums to ambient temperatures.

12. A method as claimed in claim 9 further comprising passing at least a portion of the gaseous hydrogen to a storage vessel before passing it to the dispenser.

13. A method as claimed in claim 9 wherein heat to the first and second flash drums is provided by a heat source that provides a greater heat flux than that provided by exposure to ambient conditions.

14. A method as claimed in claim 9 wherein the heat to the first and second flash drums is provided by the flash drums functioning as heat exchangers.

15. A method as claimed in claim 9 wherein a high pressure line is used to provide pressure to the head of the feed vessel to help move the liquid hydrogen from the feed vessel to the flash drums.

16. A method as claimed in claim 9 wherein the feed vessel is located higher than the flash drums to allow gravity to assist the flow of liquid hydrogen from the feed vessel to the flash drums.

17. A method of providing gaseous hydrogen to a vehicle comprising:
   storing a liquid hydrogen source in a feed vessel at a temperature of less than 30 K,
   passing a portion of the liquid hydrogen in the feed vessel to a first flash drum via a feed line connected to the feed vessel and the first flash drum;

closing a valve coupled to the feed line after the first flash drum is filled with an amount of liquid hydrogen;

vaporizing, in the first flash drum, at least a portion of the liquid hydrogen to provide gaseous hydrogen at a pressure of greater than 300 bar in the first flash drum;

passing a portion of the liquid hydrogen in the feed vessel to a second flash drum;

closing a valve coupled to an inlet of the second flash drum after the second flash drum is filled with an amount of liquid hydrogen;

vaporizing, in the second flash drum, at least a portion of the liquid hydrogen to provide gaseous hydrogen at a pressure of greater than 300 bar in the second flash drum;

passing gaseous hydrogen in the first flash drum to a dispenser and from the dispenser to a vehicle at a pressure of greater than 300 bar; and passing gaseous hydrogen in the second flash drum to the vehicle using the dispenser when the pressure in the first flash drum is insufficient to provide gaseous hydrogen to the vehicle, wherein there is no compression apparatus between the feed vessel outlet and the dispenser outlet.

18. A method as claimed in claim 17 further comprising passing a portion of the liquid hydrogen in the feed vessel to the first flash drum when the pressure in the first flash drum is insufficient to provide gaseous hydrogen to the vehicle.

19. A method as claimed in claim 17 wherein the gaseous hydrogen is passed from the dispenser at a pressure of greater than 700 bar.

\* \* \* \* \*